United States Patent [19]

Mendoza

[11] 4,197,792
[45] Apr. 15, 1980

[54] APPARATUS FOR MOLDING AND PRECOOKING CORN AND WHEAT TORTILLAS

[76] Inventor: Fausto C. Mendoza, Cumbres de Acultzingo No. 185, Mexico City, Mexico

[21] Appl. No.: 959,835

[22] Filed: Nov. 13, 1978

Related U.S. Application Data

[62] Division of Ser. No. 877,105, Feb. 3, 1978, abandoned.

[30] Foreign Application Priority Data

Jun. 14, 1977 [MX] Mexico ................................. 169463

[51] Int. Cl.² ........................................... A47J 37/00
[52] U.S. Cl. ..................................... 99/349; 99/353;
99/427; 99/443 C; 425/371; 426/523
[58] Field of Search ...................... 99/427, 443 C, 349,
99/404, 426, 373, 352, 353; 100/93 R, 153;
425/167, 371; 426/496, 505, 523, 512, 517, 497

[56] References Cited

U.S. PATENT DOCUMENTS

| | | | |
|---|---|---|---|
| 1,242,753 | 10/1917 | Aeschbach | 425/371 |
| 1,252,765 | 1/1918 | Aeschbach | 425/371 |
| 1,683,797 | 9/1928 | Pereyra | 425/371 |
| 2,907,268 | 10/1959 | Doolin | 99/427 |
| 3,565,015 | 2/1971 | Jorgensen | 425/167 |
| 3,646,880 | 3/1972 | Norris | 99/349 |
| 3,861,289 | 1/1975 | Baker | 99/427 |
| 3,937,852 | 2/1976 | Wolf | 426/505 |
| 3,942,929 | 3/1976 | DeMets | 100/153 |
| 3,985,070 | 10/1976 | Longenecker | 99/443 C |
| 4,015,517 | 4/1977 | Pomara | 99/443 C |

Primary Examiner—Billy J. Wilhite
Attorney, Agent, or Firm—Albert L. Jeffers

[57] ABSTRACT

Apparatus for forming and precooking corn and wheat tortillas and similar products under steam and pressure, simultaneously on both faces and internally, by the insertion of a portion of moldable dough between two facing mating parallel space surfaces which are heated. The surfaces undergo continuous horizontal conveyance motion and an alternate approaching and separating motion therebetween so as to exert pressure on the dough during its travel for forming the tortilla with the desired thickness and, in addition, accomplishing superficial inner precooking which uses the pressure exerted by the facing surfaces when compressing the same. The specific steam from the moisture of the dough and the inner pressure exerted by the latter are prevented from exhausting for a period of three or four seconds. This period must not be increased to the point where the inner pressure of the steam increases to the extent of disintegrating the tortilla when applying heat thereto. By means of this procedure, the quality of the tortilla is extraordinarily improved, and since it is perfectly structured, elastic flexible, and nonporous it has a longer duration and a greater resistance to hardening.

4 Claims, 4 Drawing Figures

FIG. 1

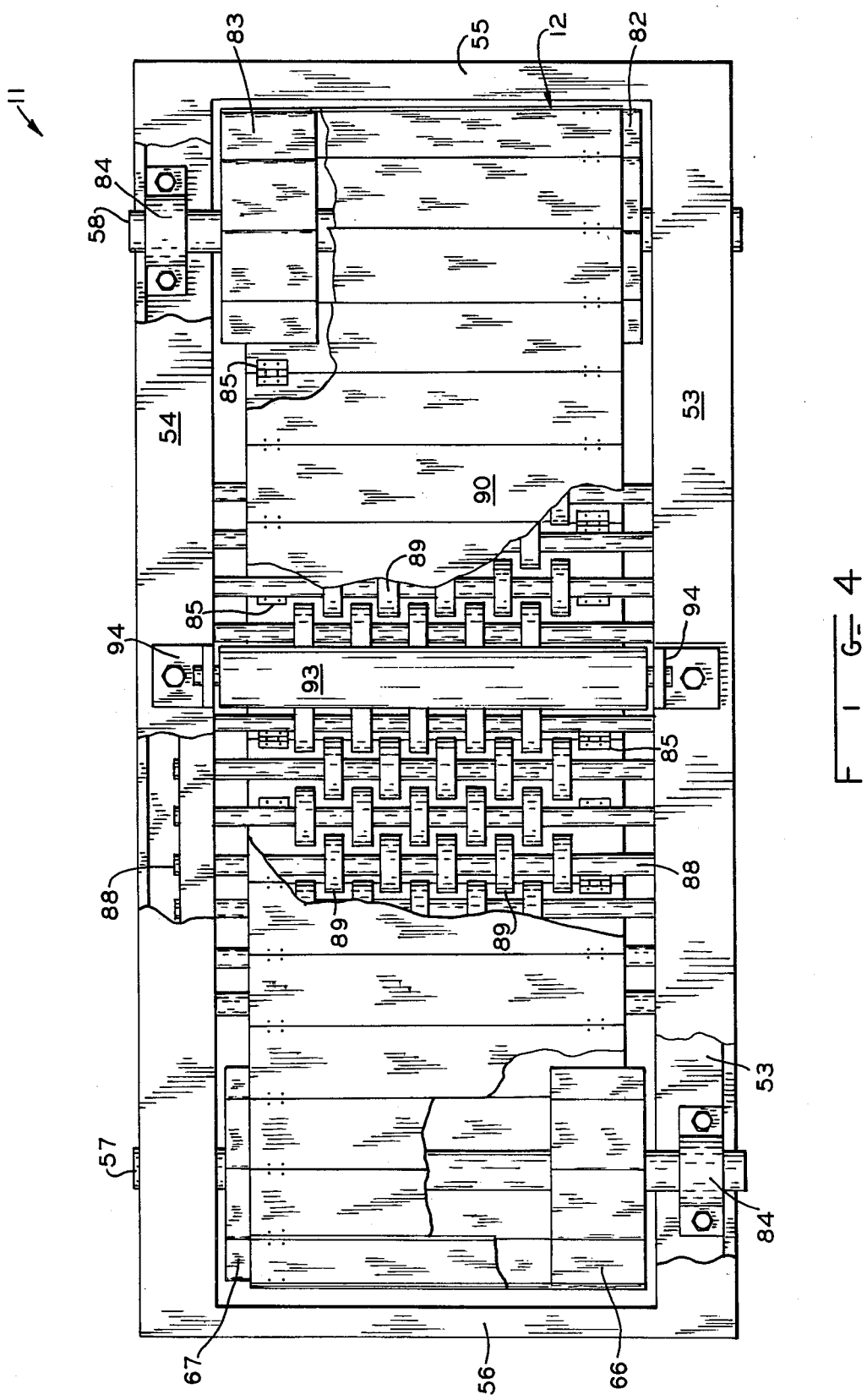

APPARATUS FOR MOLDING AND PRECOOKING CORN AND WHEAT TORTILLAS

This is a division, of application Ser. No. 877,105, filed Feb. 13, 1978 now abandoned.

BACKGROUND OF THE INVENTION

The present invention relates to apparatus for forming and precooking tortillas.

To this date, the procedures followed in the preparation of tortillas performed the molding and cooking thereof in separate operations. The molding operation has comprised different forms, from the traditional system of making them by pressing the dough between the hands, to such procedures as subjecting the dough to pressure, compressing the same between two planes, rolling the dough by means of rollers, die forming the tortillas, and extrusion. These processes, as mentioned earlier, mold the tortilla in a raw state and, just after it is molded, it is transferred to a cooker where heat is applied first to one side and, after it is half cooked, it is turned over and cooked on the other side. This procedure has several disadvantages, however. Since the cooking is effected in an alternate manner on the faces, the moisture of the dough is lost as steam through the face not contacting the hot surface. In addition to the heat loss, this causes dehydration of the dough and its becoming porous, thus damaging the appearance and quality of the tortilla which becomes excessively hard and brittle when reheated. This reduces considerably the "shelf life" of the product.

SUMMARY OF THE INVENTION

The processing of the dough comprises the insertion of a portion of moldable dough between two facing meeting parallel spaced surfaces which are heated. The surfaces undergo continuous horizontal conveyance motion and an alternating approaching and separating motion relative to each other so as to exert pressure on the dough during its travel thereby forming the tortilla with the desired thickness and accomplishing superficial inner precooking. The steam which is created upon heating the moist dough and the inner pressure exerted by the steam are prevented from exhausting for a period of three or four seconds.

The apparatus comprises two continuous heated bands, namely, an upper and a lower band, positioned in a facing mating parallel spaced manner and undergoing horizontal conveyance motion between which a portion of moldable dough is inserted and conveyed to the end of the travel. The upper continuous band moves vertically up and down in a repetitive and synchronized manner causing the passage of the dough and the compression thereof for forming the tortilla to the desired thickness. Because the continuous bands have their own source of heat, the tortilla, upon being formed, is simultaneously subjected to a uniform and homogeneous precooking directly on both of its faces. This seals the surfaces of the tortilla which prevents the inner specific steam from the moisture of the dough from escaping and allows the utilization thereof for providing the internal precooking. Precooking is also aided by utilizing, in addition, the pressure exerted by the continuous bands when compressing the dough and the inner pressure exerted by the specific steam from the moisture of the dough.

The pressure and heat exerted by the continuous bands on the tortilla does not exceed three or four seconds, as the case may be, during its travel because if this time is exceeded, the inner steam pressure increases to the extent where disintegration of the tortilla is likely to occur. Subsequent to this operation, the precooked, homogenized, structured, nonporous and sealed tortilla is ready to proceed to a second heating operation for the final cooking thereof.

By means of the process and apparatus of the present invention, the disadvantages of the traditional systems used for the preparation of tortillas are overcome. Additionally, an improved product results through the molding i.e. flattening of the dough compressed during its travel between the facing parallel spaced and heated surfaces, having a continuous horizontal conveyance motion and an alternate approaching and separating motion. In addition to achieving the desired thickness, this causes superficial and internal precooking which utilizes the pressure exerted by the facing surfaces when compressing the same, the specific steam from the moisture of the dough and the inner pressure exerted by the latter. A maximum period of three or four seconds is recommended in order to prevent the inner steam pressure from increasing to the extent of disintigrating the tortilla when heat is applied thereto.

When both faces of the tortilla are simultaneously sealed upon their coming in contact with the uniform and homogeneous heat from the facing surfaces, the specific steam from the dough is prevented from escaping and changing the quality and appearance of the product as is the case when the traditional cooking systems which leave the surface porous and brittle due to the steam which exhausts from the face not contacting the hot surface. Thus, advantage is taken of the steam as well as the pressure exerted by the facing surfaces and the inner steam pressure to provide the tortilla with a superficial and internal precooking, thereby substantially modifying the molding and cooking stages of the product. This improves the quality thereof in a substantial manner and results in a perfectly structured, elastic and flexible tortilla which has a longer shelf life and a greater resistance to hardening due primarily to the fact that it is sealed, i.e., nonporous.

These and other objects and advantages to be obtained in the performance of this invention will be better understood and appreciated by a reading of the following description, which refers to a preferred embodiment of the invention.

BRIEF DESCRIPTION OF THE DRAWINGS

Figure 1:
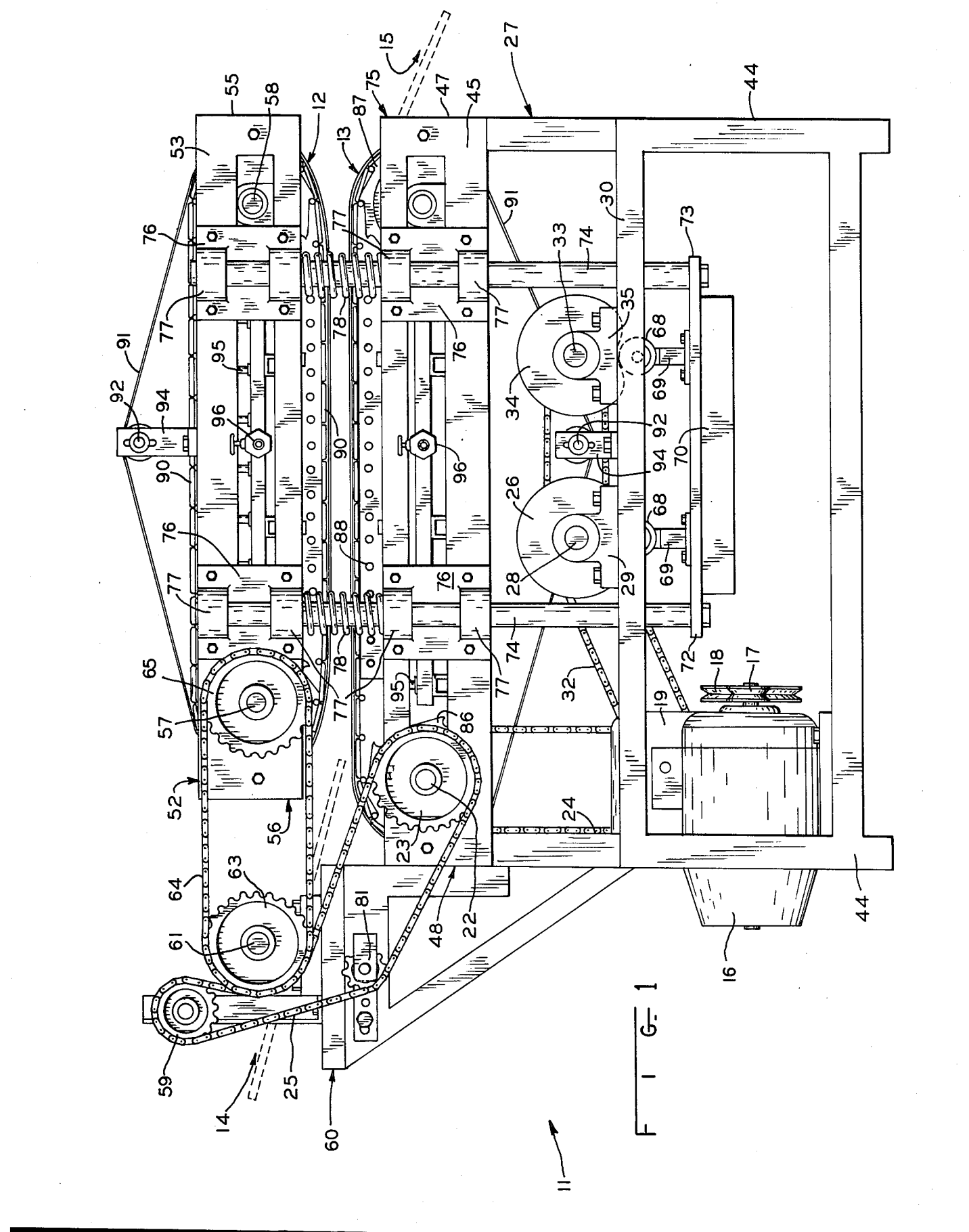

FIG. 1 is a front elevational view of the apparatus according to the invention showing the continuous bands in the position of maximum separation.

FIG. 4 is a detailed plan view similar to that of FIG. 2 wherein a portion of the casing has been broken away to illustrate the details of construction.

DETAILED DESCRIPTION OF THE INVENTION

Figure 2:
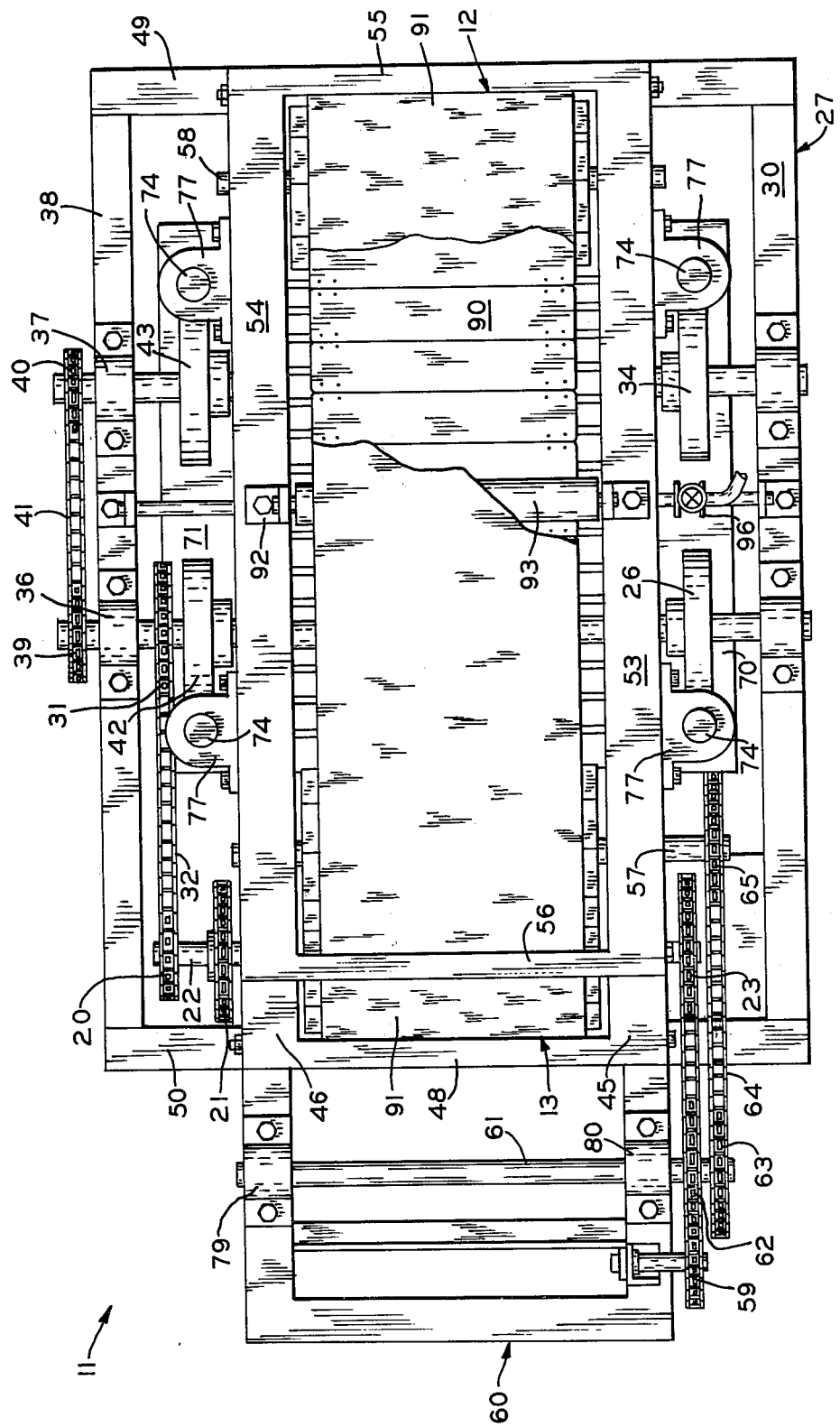
FIG. 2 is a plan view of the apparatus wherein a portion of the casing of the upper continuous band has been broken away.
Figure 3:
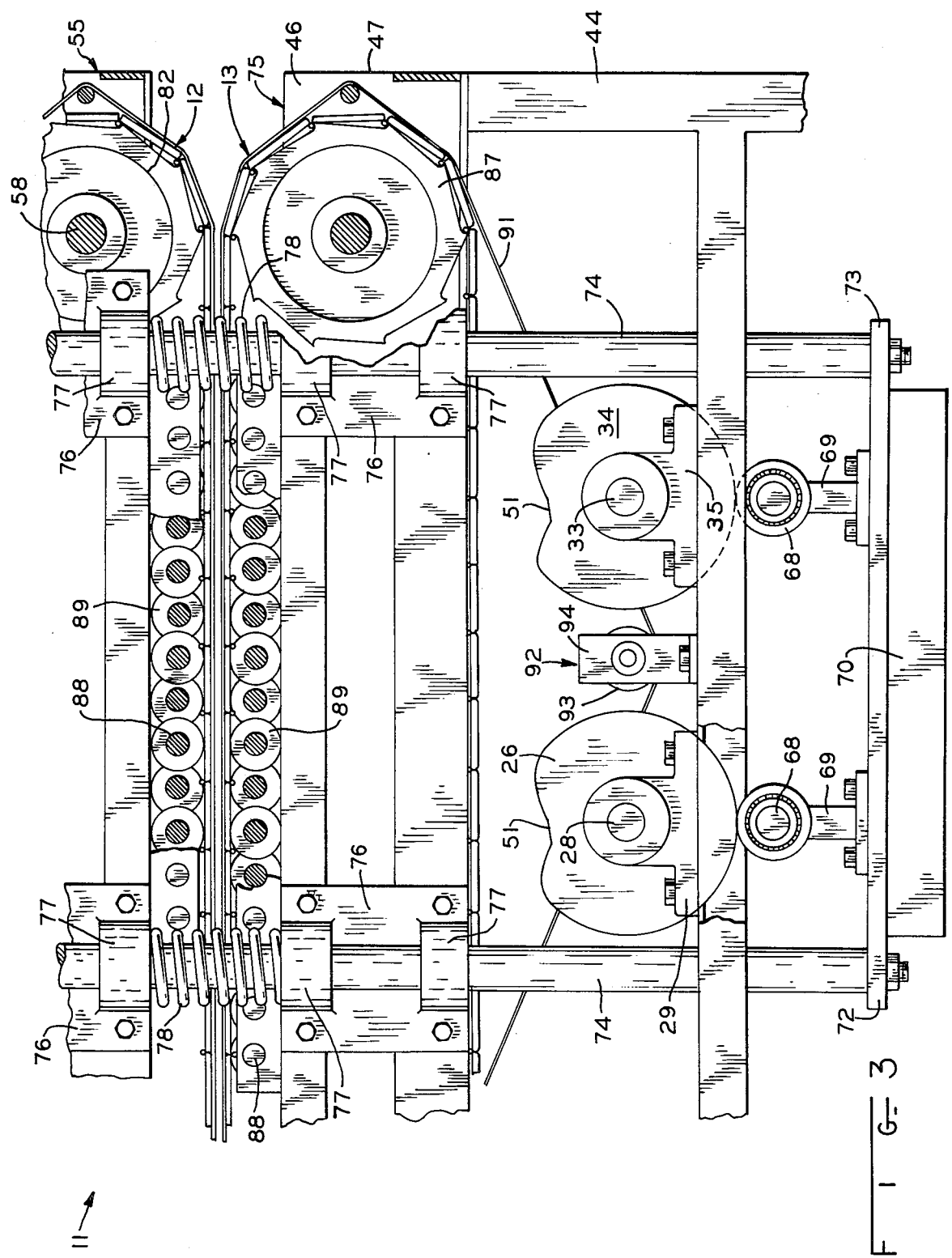
FIG. 3 is a detailed vertical elevational view of the apparatus showing the continuous bands in their respective positions of minimum separation.

The molding and precooking process for tortillas under steam and pressure comprises compressing a portion of moldable dough during the travel thereof between two facing, mating, parallel, spaced surfaces which are heated and undergo continuous horizontal conveyance motion simultaneously with an alternate approaching and separating motion therebetween. In addition to providing the tortilla with the desired thickness, this accomplishes a superficial and internal precooking which uses the pressure exerted by the facing surfaces when compressing the dough, the specific steam from the moisture of the dough and and the inner pressure of the steam applied to the inner structure of the tortilla. The inner steam is prevented from exhausting for a period of three or four seconds, for example, in order to prevent an increase in inner steam pressure to the point of disintegrating the tortilla. This is accomplished by apparatus 11 which comprises a pair of bands, namely an upper band 12 and a lower band 13, placed in a facing, mating, parallel spaced manner, which maintain a continuous horizontal conveyance motion thereby creating a travel path for the dough having an entrance 14 and an exit 15 for the molded product.

The continuous horizontal motion of the upper and lower bands 12 and 13, respectively, is performed by transferring the power of a motor 16, which may be positioned at the lower left portion of the apparatus 11, by means of a small pulley 17 mounted on the upward shaft thereof. The rotary motion is transferred through a belt (not shown) to a larger pulley 18 mounted on a speed reducer 19 which also changes the direction of the motion by virtue of a pair of gears, one of which is gear 20 and the other of which is not shown, positioned on the same shaft 22. The first gear (not shown) is utilized for the direct transfer of the rotary motion by means of a chain 24 to a third gear 21 positioned at the upper rear portion of apparatus 11. Gear 21 is directly connected to the lower continuous band 13 and the second gear 20 is utilized for transferring the motion by means of a chain 32 to gear 31, which in turn two cams 26 and 34 the function of which will discussed hereinafter.

From gear 21 there projects a shaft 22 which traverses the entire width of the lower continuous band 13 and extends out of the forward portion. Mounted on the end of shaft 22 is a further gear 23 which transfers the motion by means of chain 25 to a small gear 59 which reverses the motion so as to cause upper band 12 to travel in the same linear direction as that of lower band 13. Gear 59 is positioned at the upper left portion of the apparatus 11 on an extension 60 of the structure 27 on which a shaft 61 is also supported. Shaft 61 supports two gears 62 and 63, the first of which is supported on drive chain 25 and is utilized for transferring the rotary motion from motor 16 to drive shaft 61, which in turn rotates the other gear 63 mounted thereon.

By means of gear 63, motion will be transferred through a chain 64 to another gear 65 parallel to gear 63. Gear 65 is mounted on the end of shaft 57 positioned at the left end of the upper band 12 in such a manner as to transfer the rotary motion of the motor 16, already reversed to upper band 12, through the forward left gear 66 and rear left gear 67 positioned on shaft 57 together with gear 65. Gears 66 and 67 have already engaged the upper band 12 thus imparting thereto the required continuous horizontal motion which is similar to that of lower band 13 but in an opposite direction.

Upper continuous band 12 is provided, in turn, with upward and downward vertical motions which take place in a repetitive, sequential and synchronized manner allowing the passage and compression of the portion of dough inserted through the end 14 of the apparatus 11. The dough is conveyed, compressed and precooked along the travel thereof between the two bands 12 and 13 for a period preferably not exceeding three or four seconds. The dough is compressed when the upper band 12 is lowered toward the lower band 13.

The aforementioned vertical motion is accomplished by means of four cams 26, 34, 42 and 43 which have identical contours, each including a recess 51 which causes the lifting of the upper band 12. Cams 36 and 34 are located at the forward and lower portion of the apparatus 11, one cam 26 on the left and the other cam 34 on the right. The other two cams 42 and 43 at the rear portion of the apparatus 11, which are also aligned, one cam 34 being on the left and the other cam 43 on the right. The forward left cam 26 and the rear left cam 42 are supported on the same shaft 28 which supports them on the central portion thereof. The forward right cam 34 and right rear cam 43 are supported on shaft 33. Both shafts 28 and 33 are supported on the support structure or frame 27 which supports the apparatus by means of four journal boxes 29, 35, 36 and 37 which are attached to cross sections 30 and 38 of the frane 27.

Cams 26, 34, 42 and 43 are driven by the rotary motion of motor 16 which is transferred from gear 20 to gear 31 positioned at the rear portion of shaft 28 between the rear left cam 42 and the journal box 36 on the same side. The motion is transferred through chain 32.

Shafts 28 and 33, which impart motion to cams 26, 42, 34 and 43, project from the rear journal boxes 36 and 37 and have gears 39 and 40 mounted thereon and joined together by means of drive chain 41 thereby transferring motion from the left shaft 28 to the right shaft 33.

Supported on the camming surfaces of each forward cam 26 and 34 is a ball bearing or roller 68 which acts as a cam follower. Similar rollers or followers (not shown) are positioned on the rear cams 42 and 43. Both pairs of rollers, the forward rollers 68 and the rear rollers (not shown), rest on supports 69 which are positioned in turn on the forward horizontal 70 and rear horizontal plate 71. Guide bars 74 are secured to the left end 72 and the right end 73, two of them being positioned at the forward portion of the apparatus 11 and the other two at the rear portion thereof. Guide bars 74 are employed for the purpose of transferring the vertical motion originated by cams 26, 34, 42 and 43 to frame 52 which supports the upper continuous band 12. Supported on frame 75, which supports lower band 13, and following the vertical axis of the guide bars 74, are a plurality of plates 76, two of them being positioned at the forward portion of the apparatus 11 and two at the rear portion thereof. Other plates 76 following the same vertical axis are fixed to frame 52.

Joined to plates 76 are rings or sleeves 77 through the central portion of which the guide bar corresponding to them passes during its upward and downward reciprocal motion. Positioned on each guide bar 74 between sleeves 77 of the upper and lower continuous bands 12 and 13 are located helical springs 78 which are compressed and maintain the upper continuous band 12 at its maximum separation from lower band 13. When the rollers or cam followers 68 pass over recess 51 of cams 26, 34, 42 and 43, the helical springs 78 tend to lift the frame 52 of the upper continuous band 12 thereby leaving sufficient space between the bands 12 and 13 to permit the portion of dough from which the tortilla is to be formed pass.

The upper and lower continuous bands 12 and 13 are carried on frame 27 having a base supported on legs 44, one at each end, and cross sections.

Legs 44 are relatively short since the supporting frame 75 of lower band 13 is supported by and attached to the upper portion thereof. Frame 75 comprises a forward section 45 and a rear section 46 which are below the natural level of legs 44, the right side leg 47 and the left side leg 48. At approximately halfway up legs 44 of structure 27 there is positioned another frame with cross sections and comprising forward section 30, rear section 38, right side section 49 and left side section 50. On the forward section thereof, there are positioned the journal boxes 29 and 35 supporting the shafts 28 and 33 on which are supported respectively cams 26, 34, 42 and 43. On the rear section 38 are supported the rear journal boxes 36 and 37.

On the left side of the structure 27 there is positioned an extension or bracket 60 on which, as mentioned previously, gear 59 and shaft 61 are positioned. Shaft 61 extends from rear journal box 79 through forward journal box 80 and gears 62 and 63 are mounted on the forward end thereof. On bracket 60 there is also supported tension gear 81 which adjusts the tension of chain 25.

Upper band 12 is carried on frame 52 comprising a forward section 53, a rear section 54, a right side section 55 and a left side section 56. On the left end and right end of frame 52 are positioned shafts 57 and 58, respectively, which traverse frame 52 over its entire width, i.e. from the forward section 53 to the rear section 54. Forward gear 66 and rear gear 67 are mounted on shaft 57 whereas forward gear 82 and rear gear 83 are mounted on shaft 58. Both shafts are supported on structure 27 by means of the journal boxes 84 positioned on the cross member or forward section 53 and on the rear section 54. Gears 66, 67 and 82, 83 impart continuous horizontal motion to upper band 12 which comprises, similarly to lower band 13, of rectangular plates 90 joined together by means of joints or hinges 85 positioned in their longest sections.

The positioning of rectangular plates 90 which form the bands 12 and 13 is transversely to the motion thereof. Gears 66, 67, 82 and 83 of upper band 12 are supported on hinges 85, as well as the forward left gear 86, the rear left gear (not shown), the forward right gear 87 and the rear left gear (not shown) of the lower continuous band 13. The last mentioned gears are similar to those of upper band 12 described above and perform the same function of transferring motion by being supported on hinges 85.

In order that the upper band 12 and lower band 13 maintain the same pressure during travel of the dough therebetween, a plurality of shafts 88 are positioned in a transverse manner to the motion of bands 12 and 13. Shafts 88 traverse bands 12 and 13 across their entire width and are supported on frames 52 and 75, respectively. A series of rollers 89 are positioned along shafts 88 and maintain the uniformity of pressure of the continuous bands 12 and 13. Rollers 89 are attached to the respective shafts 88 which rotate with a free motion following the direction of the band with which they are associated.

In order to prevent the dough from coming in direct contact with the rectangular metal plates 90 which actually form bands 12 and 13, a plastic covering or casing 91 is utilized. This casing 91 may be made of Teflon and for each band 12 and 13 tension is provided thereto with the aid of a tension adjustor 92 for each band 12 and 13. Adjustor 92 comprises a roller 93 which extends over the entire width of the Teflon casing 91 and which may be raised or lowered by means of guides 94 positioned at the ends thereof.

In order to provide heat to bands 12 and 13, a plurality of burners 95 are positioned within the inner portion of upper band 12 over its entire length and width so that the flame will come into direct contact with the rectangular plates 90. For lower band 13, they are concentrated on the right and left ends thereof since shafts 88 and rollers 89 are located in the central portion. The supply of gas feeding burners 95 is regulated by valve 96 which may be positioned at the forward and central portions of each band.

The pressure exerted by bands 12 and 13 on the tortilla preferably does not exceed three or four seconds during its travel in order to prevent the inner steam pressure from increasing to the point where the tortilla will be disintegrated.

After being processed in the apparatus described above, the precooked, homogenized, structured, sealed and nonporous tortilla is ready for processing in a second heating operation for the final cooking thereof. Precooking is achieved by the application of heat and pressure from the bands 12 and 13 in addition to the internally generated steam for a period of three or four seconds.

Although the present invention has been described in terms of a specific apparatus, it will be understood that it is intended to cover any variations, uses or adaptations of the invention following the general principles thereof and falling within the scope of the invention and the broad limits of the appended claims.

What is claimed is:

1. Apparatus for molding and precooking tortillas under steam and pressure comprising:
   upper and lower continuous conveyor bands having parallel facing surfaces for molding the tortilla,
   supporting structure for each of said bands,
   means for driving said bands in synchronism,
   means reciprocably connecting said bands for vertical movement relative to each other including sleeves connected to the supporting structure for each band and vertical bars received in said sleeves,
   means for causing one of said bands to reciprocate including cam followers connected to said vertical bars and cams having varying diameter surface means in contact with said cam followers for causing said one band to move toward and away from the other band,
   spring means urging aid bands apart against the action of said cams, said
   means for imparting heat to said bands to precook the tortillas during molding thereof.

2. The apparatus of claim 1 including a film of heat resistant flexible material covering each of said bands,
   means for adjusting the tension of said films including transverse rollers extending the width of said films and means for adjusting the positions of said rollers.

3. The apparatus of claim 1 wherein said bands comprise joined plates and said means for imparting heat to said bands includes gas burner means positioned within the bands for directing a flame against said plates and valve means for regulating the flame for each of said burner means.

4. The apparatus of claim 1 including a plurality of shaft mounted roller means within each of said bands for preventing the bands from yielding as the dough is compressed, said rollers rotating in positions following the contour of their respective bands.

* * * * *

UNITED STATES PATENT AND TRADEMARK OFFICE
CERTIFICATE OF CORRECTION

PATENT NO. : 4,197,792
DATED : April 15, 1980
INVENTOR(S) : Fausto C. Mendoza

It is certified that error appears in the above—identified patent and that said Letters Patent is hereby corrected as shown below:

Col. 2, line 32, "when" should be -- with --.

Col. 4, line 12, "36" should be -- 26 --.

Claim 1, Col. 6, line 49, "said" second occurrence, should be -- and --.

Signed and Sealed this

Twelfth Day of August 1980

[SEAL]

Attest:

SIDNEY A. DIAMOND

Attesting Officer

Commissioner of Patents and Trademarks